United States Patent [19]

Amano et al.

[11] Patent Number: 5,328,666
[45] Date of Patent: Jul. 12, 1994

[54] POLYMERIZING APPARATUS

[75] Inventors: Tadashi Amano, Kamisu; Shuji Ohnishi, Hasaki, both of Japan

[73] Assignee: Shin-Etsu Chemical Co., Ltd., Tokyo, Japan

[21] Appl. No.: 4,567

[22] Filed: Jan. 14, 1993

[30] Foreign Application Priority Data

Jan. 14, 1992 [JP] Japan ................... 4-024420

[51] Int. Cl.$^5$ .................................................. B01J 8/00
[52] U.S. Cl. ................................... 422/138; 422/132; 526/67; 526/68; 526/69; 526/70
[58] Field of Search ............... 422/132, 138, 198, 235; 526/67, 68, 69, 70

[56] References Cited

U.S. PATENT DOCUMENTS

| | | | |
|---|---|---|---|
| 4,442,271 | 4/1984 | Rau et al. | 526/68 |
| 4,464,517 | 8/1984 | Makino et al. | 422/138 |
| 4,861,845 | 8/1989 | Slocum et al. | 526/68 |
| 4,870,143 | 9/1989 | Hashiguchi et al. | 526/70 |

*Primary Examiner*—Timothy M. McMahon
*Attorney, Agent, or Firm*—Oblon, Spivak, McClelland, Maier & Neustadt

[57] ABSTRACT

In a polymerizing apparatus which comprises a polymerization vessel and a circulating line comprising a heat exchanger installed outside said polymerization vessel and a circulating pipeline extending from said polymerization vessel and returning to said polymerization vessel through said heat exchanger, the improvement comprising a strainer installed in the course of said circulating pipeline. Since polymer scale and a polymer in the form of blocks formed in the circulating line can be trapped, the circulating pipeline and tubes of the heat exchanger can be prevented from being blocked up. Further, since they can be prevented from mixing with a reaction mixture in the polymerization vessel, when the obtained polymer is worked into a molded item such as a sheet, fish eyes can be prevented from increasing. Therefore, a polymer can be produced efficiently with high productivity.

8 Claims, 5 Drawing Sheets

POLYMERIZING APPARATUS

BACKGROUND OF THE INVENTION

1. Field of the Invention

The present invention relates to a polymerizing apparatus for polymerizing a monomer having an ethylenically unsaturated double bond wherein in a polymerization is carried out in a polymerization vessel while a reaction mixture is circulated through a heat exchanger installed separately from the polymerization vessel.

2. Description of the Prior Art

The polymerization reaction of a monomer having an ethylenically unsaturated double bond is carried out in such a manner that a polymerization medium such as water, a dispersant, a polymerization initiator, a monomer having an ethylenically unsaturated double bond, and, optionally, other various additives are charged into a polymerization vessel equipped with a jacket and a reflux condenser, then the temperature in the polymerization vessel is elevated and the polymerization reaction is effected while a certain temperature is kept. Further, during this polymerization reaction, in order to retain the inside of the reaction vessel at that certain temperature, it is required to remove the heat of polymerization reaction, so that cooling water is circulated through the jacket and the reflux condenser.

In recent years, in order to improve the productivity, the following measures are taken: (1) the polymerization vessel is made large in size and (2) the polymerization time per batch is shortened. However, since the enlargement of the polymerization vessel has resulted in a decrease in the ratio of the heat transfer area to the volume of the reaction mixture, the above prior technique of removing the heat of polymerization reaction has become insufficient in capacity for removing the heat. In addition, if the polymerization time per batch is shortened, the capacity for removing the heat becomes insufficient further because the rate of the generation of heat due to the polymerization reaction per unit time increases.

Some techniques for overcoming the above disadvantages are suggested and, as effective techniques out of them, techniques wherein a reaction mixture is circulated through a heat exchanger installed outside a polymerization vessel (see Japanese Pre-examination Patent Publication (kokai) Nos. 54-24991 (1979), 56-47410 (1981), and 58-32606 (1983) and Japanese Patent Publication (kokoku) No. 64-11642 (1989)) can be mentioned. These techniques are quite effective in that the ratio of the heat transfer area to the volume of the reaction mixture can be increased.

However, according to these techniques, there is a problem that polymer scale or a polymer in the form of blocks which is supposed to be formed in a circulating line made up of the heat exchanger and a circulating pipeline connecting the heat exchanger and the polymerization vessel blocks up the circulating pipeline or heat exchanger tubes. Further, when the obtained polymer is worked into a molded product such as a sheet, fish eyes increase.

SUMMARY OF THE INVENTION

An object of the present invention is to provide a polymerizing apparatus for polymerizing a monomer having an ethylenically unsaturated double bond which comprises a polymerization vessel and a circulating line comprising a heat exchanger installed outside the polymerization vessel and a circulating pipeline extending from said polymerization vessel and returning to said polymerization vessel through that heat exchanger, in which the circulating pipeline and heat exchanger tubes are prevented from being blocked up and by which a polymer can be produced which can be worked into a molded product such as a sheet with a very small number of fish eyes.

The present inventors have studied keenly in various ways and have solved the above subject.

The present invention provides a polymerizing apparatus which comprises a polymerization vessel and a circulating line comprising a heat exchanger installed outside said polymerization vessel and a circulating pipeline extending from said polymerization vessel and returning to said polymerization vessel through said heat exchanger, wherein a strainer is installed in the course of said circulating pipeline.

According to the present invention, since polymer scale deposited in a circulating line and then peeled off therefrom or a polymer in the form of blocks formed in said line can be trapped, a circulating pipeline and heat exchanger tubes can be prevented from being blocked up. Further, since polymer scale and a polymer in the form of blocks can be prevented from mixing with the reaction mixture, when the obtained polymer is worked into a molded item such as a sheet, fish eyes can be prevented from increasing. Accordingly, by using the present polymerization apparatus, a polymer can be produced efficiently with high productivity.

DETAILED DESCRIPTION OF PREFERRED EMBODIMENTS

According to the study made by the present inventors, it has been confirmed that polymer scale or a polymer in the form of blocks that is supposed to be formed particularly at positions where the flow of a reaction mixture becomes stagnant in a circulating line or at like positions causes tubes of a heat exchanger to be blocked up or mixes with the reaction mixture to cause fish eyes of the product molded from the obtained polymer to increase. To cope with this, the present inventors have found a method of trapping polymer scale or a polymer in the form of blocks by installing a strainer in the course of a circulating pipeline.

It is suggested that the strainer is installed in the course of the circulating. pipeline. Generally a heat exchanger comprises a tubular casing and a number of fine tubes housed in said casing. A heating or cooling medium is passed outside said tubes and a reaction mixture is passed through the tubes, thereby carrying out heat exchange. In particular, since the inner diameter of heat exchanger tubes is smaller than that of a circulating pipeline and the heat exchanger tubes are liable to be blocked up, preferably the strainer is installed in the course between the bottom of the polymerization vessel and the inlet of the heat exchanger, and more preferably the strainer is installed in the course between the bottom of the polymerization vessel and the inlet of the heat exchanger and is positioned as near as possible to the heat exchanger unless the installation is not attended with any trouble.

Figure 1:
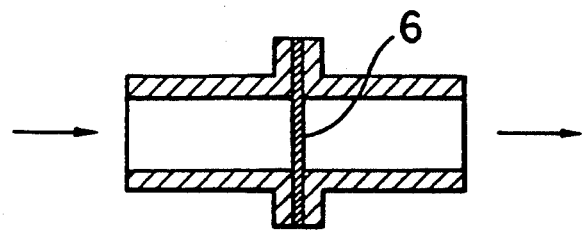
FIG. 1 is a sectional view of one embodiment of a strainer to be installed in the present polymerization apparatus.
Figure 2:
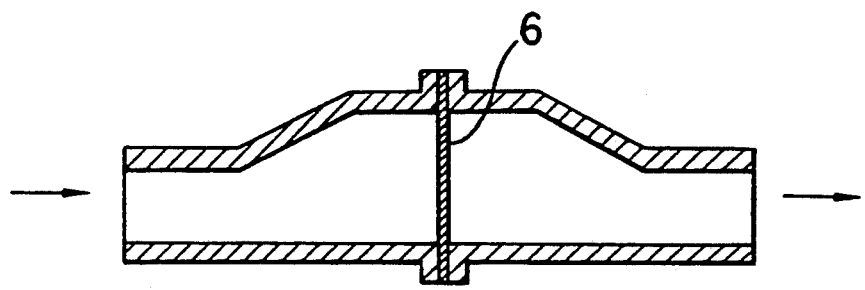
FIG. 2 is a sectional view of one embodiment of a strainer to be installed in the present polymerization apparatus.
Figure 3:
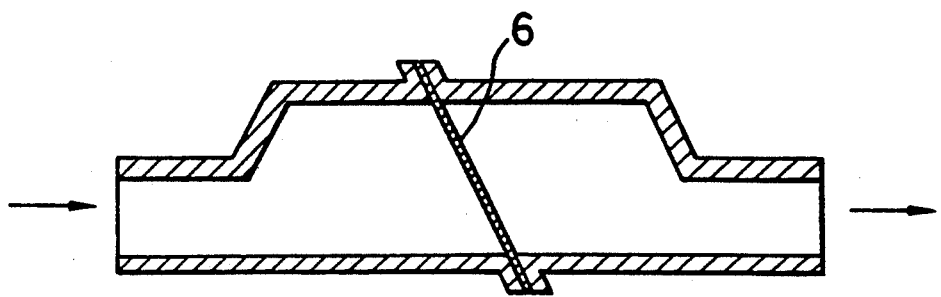
FIG. 3 is a sectional view of one embodiment of a strainer to be installed in the present polymerization apparatus.
Figure 4:
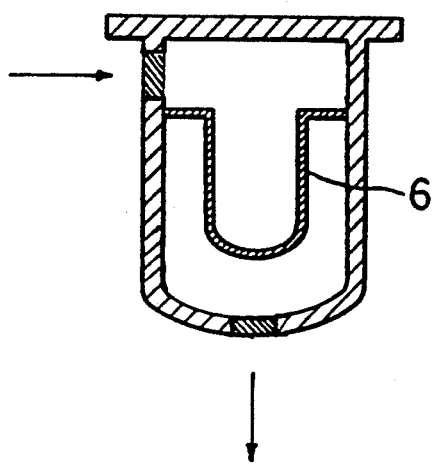
FIG. 4 is a sectional view of one embodiment of a strainer to be installed in the present polymerization apparatus.

It is recommended that the strainer has a structure that does not allow a reaction mixture to become stagnant. In FIGS. 1 to 4, embodiments of strainers are shown which can be used in the present invention. FIGS. 1 to 4 are cross sectional views of strainers having a filter 6 therein. FIGS. 1 to 3 show in-line type strainers, and FIG. 4 shows a basket type strainer. Among these, preferable ones are the strainers having the structures shown in FIGS. 3 and 4.

Figure 5:
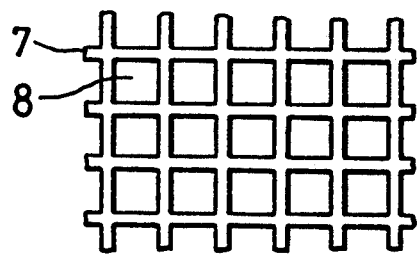
FIG. 5 shows a filter having square openings.
Figure 6:
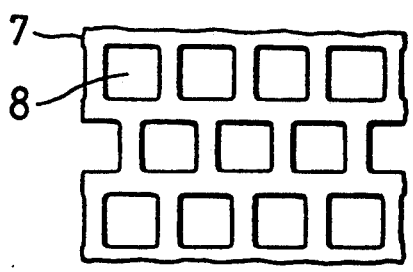
FIG. 6 shows a filter having square openings.
Figure 7:
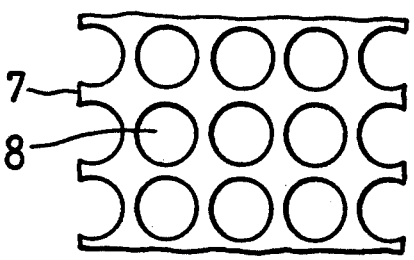
FIG. 7 shows a filter having circular openings.
Figure 8:
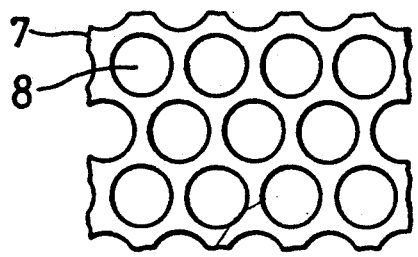
FIG. 8 shows a filter having circular openings.
Figure 9:
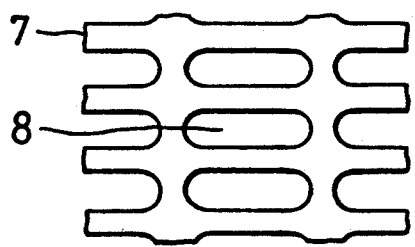
FIG. 9 shows a filter having oval openings.
Figure 10:
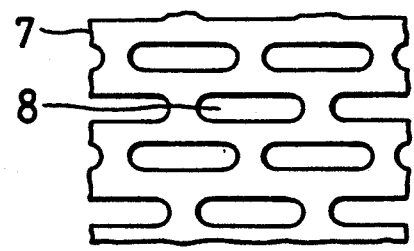
FIG. 10 shows a filter having oval openings.

The inside of the strainer is provided with a filter having smooth surfaces with openings in the form, for example, of a punching metal, a perforated metal or a metal plate with openings formed by drilling, by which polymer scale and a polymer in the form of blocks is trapped. Openings of the filter may have various shapes. When the rectangle with the smallest area circumscribing an opening is assumed, herein, the length of the long side of the rectangle is referred to as the length of the opening and the length of the short side is referred to as the breadth of the opening. Filters having various openings 8 formed by perforating metals 7 are shown by way of example in FIGS. 5 to 10. FIGS. 5 and 6 show filters having square openings, FIGS. 7 and 8 show filters having circular openings, and FIGS. 9 and 10 show filters having oval openings. Use may be made of a filter with openings whose size is smaller than the inner diameter of the heat exchanger tubes but large enough not to hinder the flow of a reaction mixture (the inner diameter of the heat exchanger tubes is generally on the order of 10 to 60 mm and the linear velocity of the flow of a reaction mixture is generally 0.5 m/sec or more, preferably 0.5 to 2.5 m/sec.). Preferably, use is made of a filter wherein the length of the openings is smaller than the inner diameter of heat exchanger tubes. The breadth of the openings may be generally on the order of 5 to 30 mm.

Now, the present polymerizing apparatus will be described specifically based on the illustrated drawings.

Figure 12:
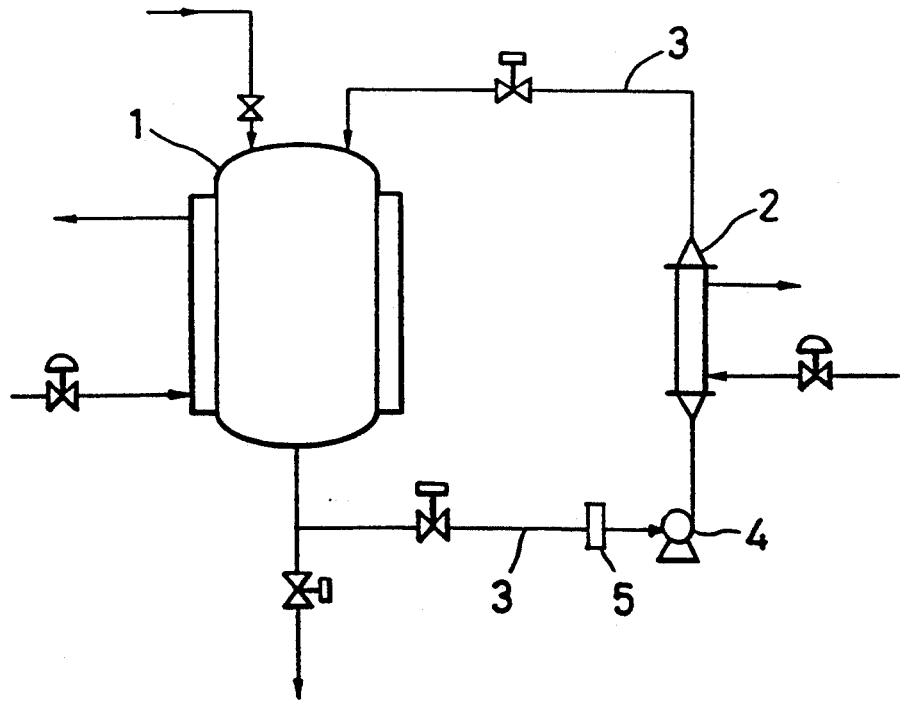
FIG. 12 is a view schematically illustrating the whole of the present polymerization apparatus.

FIG. 12 is a view illustrating schematically the whole of the polymerizing apparatus according to the present invention, which comprises a polymerization vessel 1, a heat exchanger 2 for heating or cooling a reaction mixture, and a circulating pipeline 3 extending from the bottom of the polymerization vessel 1 and returning to the polymerization vessel 1 through the heat exchanger 2. The present polymerizing apparatus is provided with a circulating pump 4 in the course of the circulating pipeline 3. Further, this polymerizing apparatus has a strainer 5 in the course of the circulating pipeline 3 between the polymerization vessel 1 and the heat exchanger 2.

In the present polymerizing apparatus, an aqueous reaction mixture of a monomer, an aqueous medium, a dispersant, an oil-soluble polymerization initiator, etc. that has been charged into the polymerization vessel 1 is withdrawn from the bottom of the polymerization vessel 1 by the circulating pump 4, then is passed through the circulating pipeline 3 to the heat exchanger 2, where it is cooled or heated, and is returned to the gaseous phase part or the liquid phase part in the polymerization vessel 1 again through the circulating pipeline 3. Polymer scale or a polymer in the form of blocks formed during the circulation of the reaction mixture is trapped by the strainer 5.

As the polymerization vessel 1 of the present polymerizing apparatus, a polymerization vessel of the conventionally known type can be used which is equipped with an agitator, a reflux condenser, a baffle, or a jacket, etc. The agitator is of a stirring blade type such as a paddle type, a Pfaudler type, a Brumagin type, a propeller type, and a turbine type, and, if necessary, is used in combination with a baffle such as a flat plate, a cylinder, and a hair pin coil.

As the heat exchanger 2, a generally used heat exchanger such as a multi-pipe type heat exchanger, a coil type heat exchanger, a spiral type heat exchanger, or a trombone cooler can be used, and as a heating/cooling medium therefor, for example, steam, cooling water, and brine can be used. The circulating pipeline 3 itself may be a double pipe, so that the efficiency of the removal of heat may be increased by passing cooling water or brine through the outer space thereof.

The circulating pump 4 is desirably of a low-shear type, and preferably is a pump having a structure with an impeller made up of a single helical blade attached to a conical hub. As an example of a pump having such a structure, a pump commercially available under the trade name of "Hidrostal Pump" (manufactured by Taiheiyo Kinzoku Co.) can be mentioned.

The polymerization vessel 1, the heat exchanger 2, the circulating pipeline 3, the circulating pump 4, the strainer 5 and other parts including valves which will be in contact with the reaction mixture are preferably made of a stainless steel, for example, the stainless steel of the "18- 8"austenire type, the "13" chromium ferrite type, the martensite type, the "18" chromium ferrite type, the high-chromium ferrite type, or the dual-phase austenite/ferrite type in view of the heat transfer and corrosion resistance. These parts may also be coated with a polymer scale preventive agent which is conventionally known or such an agent may be mixed with the aqueous suspension reaction mixture.

The monomer having an ethylenically unsaturated double bond which will be polymerized in the present polymerizing apparatus includes a vinyl halide such as vinyl chloride; a vinyl ester such as vinyl acetate and vinyl propionate; acrylic acid and methacrylic acid and their esters or salts; maleic acid and fumaric acid and their esters or anhydrides; a diene monomer such as butadine, chloroprene, and isoprene; and styrene, acrylonitrile, a vinylidene halide, and a vinyl ether. The present polymerizing apparatus is suitable for the production particularly of a vinyl chloride polymer, for example, of a vinyl chloride among the above monomers. The vinyl chloride polymer includes, in addition to a vinyl chloride homopolymer, a copolymer (generally containing 50% by weight of vinyl chloride) of a vinyl chloride with other vinyl monomer. The comonomer that can be copolymerized with the vinyl chloride includes an α-olefin such as ethylene, propylene, 1-butene, 1-pentene, 1-hexene, 1-heptene, 1-octene, 1-nonene, 1-decene, 1-undecene, 1-dodecene, 1-tridecene, and 1-tetradecene; an acrylic acid or its ester such as acrylic acid, methyl acrylate, and ethyl acrylate; a methacrylic acid or its ester such as methacrylic acid, methyl methacrylate, and ethyl methacrylate; maleic acid or its ester; a vinyl ester such as vinyl acetate and vinyl propionate; a vinyl ether such as vinyl lauryl ether and vinyl isobutyl ether; maleic anhydride; acrylonitrile; styrene; vinylidene chloride; and other monomer copolymerizable with vinyl chloride, which may be used singly or as a mixture of two or more.

The present polymerizing apparatus is suitable for the polymerization that is carried out in an aqueous medium such as suspension polymerization and emulsion polymerization.

Now, a general polymerization method will specifically be described herein below by giving, as examples, suspension polymerization and emulsion polymerization.

First, water and a dispersant are charged into a jacketed polymerization vessel, and then after the inside of the polymerization vessel is evacuated so that the pressure may be reduced to 0.1 to 760 mmHg, a monomer is charged (at that time, generally the internal pressure of the polymerization vessel will become 0.5 to 30 kgf/cm$^2$·G). Then a polymerization intiator is charged and hot water is passed through the jacket to elevate the temperature in the polymerization vessel to 30° to 150° C. so that the polymerization reaction may be initiated. Then, cooling water is passed through the jacket and the reaction mixture in the polymerization vessel is circulated through the heat exchanger positioned outside so that the polymerization may be effected with the temperature in the polymerization vessel kept at the above-mentioned temperature. During the polymerization, if necessary, one or more of water, a dispersant, and a polymerization initiator are added. The reaction temperature of the polymerization may vary depending on the type of the monomer to be polymerized, and, for instance, in the case of polymerization of vinyl chloride, the polymerization is effected at 30° to 80° C., and in the case of polymerization of styrene, the polymerization is effected at 50° to 150° C. The polymerization can be judged to be completed when the internal pressure of the polymerization vessel drops to 0 to 7 kgf/cm$^2$·G, or when the difference between the inlet temperature and the outlet temperature of the cooling water flowing into and out from the jacket provided around the outer circumference of the polymerization vessel becomes almost zero (i.e., when heat is not generated by the polymerization reaction). After the completion of the polymerization, unreacted monomer is recovered and the produced polymer is taken out from the polymerization vessel. Generally, the water, the dispersant, and the polymerization initiator that are charged when the polymerization is carried out are in amounts 20 to 500 parts by weight, 0.01 to 30 parts by weight, and 0.01 to 5 parts by weigh, respectively, per 100 parts by weight of the monomer.

Other conditions that are used in the polymerization, for example, the method of charging an aqueous medium, a monomer, a polymerization initiator, a dispersant, or the like into the polymerization vessel and the charging ratio of them may be the same as those of the prior art. It is also optional to add to the polymerization system, if necessary, a polymerization modifier, a chain transfer agent, a pH adjustor, a gelation improver, an antistatic agent, a crosslinking agent, a stabilizer, a filler, an antioxidant, a buffer, a scale preventive, and the like which are suitably used in the polymerization of a vinyl chloride.

EXAMPLES

Now, specific modes of the present invention will now be described herein below based on the Example and the Comparative Example, but the present is not restricted to them.

Example 1

Figure 11:
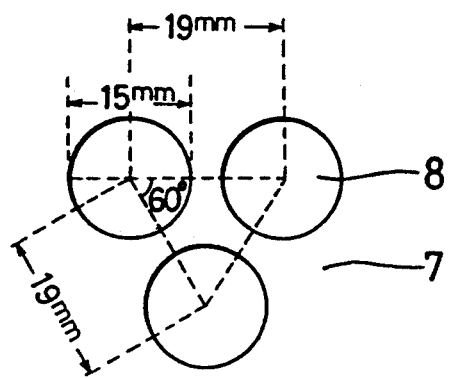
FIG. 11 is a diagram showing the state of openings of the filter used in Example 1.

A jacketed polymerization vessel 1 of a stainless steel having an internal volume of 2.1 m$^3$, a shell and tube multipipe type heat exchanger 2 (with a tube inner diameter of 22.2 mm) having a heat transfer area of 5.0 m$^2$, a 5 m$^3$/hr×2 m Hidrostal Pump 4 (having a flow rate variable apparatus using an invertor) as a circulating pump, and an in-line-type strainer 5 (with the structure shown in FIG. 1) having a filter (the thickness: 6 mm; the diameter of the openings: 15 mm, the distance between the centers of the openings: 19 mm; and the number of the openings: 14 (see FIG. 11)) were connected through a circulating pipeline 3 (having an internal diameter of 81.1 mm), valves, etc. as shown in FIG. 12.

An aqueous solution made up of 840 kg of deionized water, 240 g of a partially saponified polyvinyl alcohol, and 160 g of a cellulose ether was placed in said polymerization vessel. Then after the polymerization vessel was evacuated until the internal pressure reached 50 mmHg, 670 kg of vinyl chloride monomer was charged into the polymerization vessel. While the thus obtained mixture was stirred, 2010 g of di-2-ethylhexyl peroxydicarbonate was pumped thereinto. Thereafter, hot water was passed into the jacket of the polymerization vessel to elevate the temperature in the polymerization vessel. After the polymerization reaction is started, cooling water was passed through the jacket, and, after 30 min, circulation of the reaction mixture in the polymerization vessel through the outside is started and at the same time cooling water having a temperature of 30° C. was supplied to the heat exchanger at a rate of 10 m$^3$/hr. The polymerization was continued with the internal temperature of the polymerization vessel kept at 55° C. When the internal pressure of the polymerization vessel dropped to 6.5 kg/cm$^2$·G, the reaction was stopped. Then unreacted monomer was recovered, and the produced vinyl chloride polymer in the form of a slurry was extracted outside the polymerization vessel and was dehydrated and dried.

With respect to the obtained vinyl chloride polymer, the bulk specific gravity, the particle size distribution, the plasticizer take-up, and the number of fish eyes of a sheet molded from the obtained vinyl chloride polymer were measured in accordance with the following way. The results are shown in Table 1.

(1) Bulk specific gravity: the measurement followed JIS K-6721.

(2) Particle size distribution: the polymer was sieved using #60, #80, #100, #150, and #200 sieves according to JIS Z-8801 and the passed amounts (% by weight) were measured.

(3) Plasticizer take-up: Glass fiber was loaded into the bottom of an aluminum alloy container having an inner diameter of 25 mm and a depth of 85 mm and 10 g of the sampled obtained vinyl chloride polymer was charged thereinto. 15 cc of dioctyl phthalate (hereinafter referred to as DOP) was added thereto, and they were allowed to stand for 30 min thereby permitting the DOP to be incorporated well in the polymer. Thereafter, excess DOP was centrifuged under an acceleration of 1500 G and the amount of the DOP absorbed into the 10 g polymer was measured and was expressed in terms of value per 100 g of the polymer.

(4) Fish eyes: 25 g of a mixture prepared by mixing 100 parts by weight of the vinyl chloride polymer, 50 parts by weight of dioctyl phthalate, 0.5 part by weight of tribasic lead sulfate, 1.5 parts by weight of lead stearate, 0.1 part by weight of titanium oxide, and 0.05 part by weight of carbon black was kneaded at 140° C. for 5 min with a 6-inch kneading roll and was formed into a sheet having a width of 15 cm and a thickness of 0.2 mm. Transparent particles in the obtained sheet per 100 $cm^2$ was counted.

The state in the circulating line after the completion of the polymerization was investigated, and the results are shown in Table 1.

Comparative Example 1

The polymerization of Example 1 was repeated, except that the strainer 1 was not installed.

With respect to the obtained vinyl chloride polymer, in the same way as in Example 1, the bulk specific gravity, the particle size distribution, the plasticizer take-up, and the number of fish eyes of a sheet molded from the obtained vinyl chloride polymer were measured. The results are shown in Table 1.

The state in the circulating line after the completion of the polymerization was investigated, and the results are shown in Table 1.

TABLE 1

|  |  | Example 1 | Comparative Example 1 |
|---|---|---|---|
| Bulk specific gravity |  | 0.530 | 0.521 |
| Particle size distribution (passed amount in wt. %) | #60 | 100 | 99.5 |
|  | #80 | 72.3 | 72.1 |
|  | #100 | 41.6 | 42.8 |
|  | #150 | 20.7 | 20.9 |
|  | #200 | 0.9 | 1.1 |
| Plasticizer take-up (g) |  | 24.0 | 23.8 |
| Fish eyes (number) |  | 4 | 180 |
| State in the circulating line |  | 50 g of a polymer in the form of blocks was trapped in the strainer. The heat exchanger tubes were not blocked up. A | The heat exchanger tubes were blocked up with a transparent polymer in the form of blocks. |

TABLE 1-continued

| Example 1 | Comparative Example 1 |
|---|---|
| very little polymer scale deposited in part of the circulating pipe. | Polymer scale deposited and grown in part of the circulating pipe. |

We claim:

1. In a polymerizing apparatus which comprises a polymerization vessel for polymerization which is carried out in an aqueous medium and a circulating line comprising a heat exchanger installed outside said polymerization vessel and a circulating pipeline extending from said polymerization vessel and returning to said polymerization vessel through said heat exchanger, the improvement comprising a strainer installed in the course of said circulating pipeline, wherein said circulating pipeline extends from a bottom of the polymerization vessel to an inlet of said heat exchanger, and wherein said strainer is installed in the course between the bottom of said polymerization vessel and the inlet of said heat exchanger, further wherein said strainer comprises a filter having smooth surfaces with openings attached to the inside of said strainer.

2. A polymerizing apparatus as claimed in claim 1, wherein said strainer is installed at a position adjacent said heat exchanger.

3. A polymerizing apparatus as claimed in claim 1, wherein the heat exchanger includes tubes having an inner diameter and the size of the openings of said filter is smaller than the inner diameter of the tubes of said heat exchanger but large enough not to hinder the flow of a reaction mixture.

4. A polymerizing apparatus as claimed in claim 1, wherein said filter is in the form of a perforated or punched metal.

5. A polymerizing apparatus as claimed in claim 4, wherein the heat exchanger includes tubes having an inner diameter and the size of the openings of said filter is smaller than the inner diameter of the tubes of said heat exchanger but large enough not to hinder the flow of a reaction mixture.

6. A polymerizing apparatus as claimed in claim 1, wherein said strainer comprises a filter plate extending across said circulating pipeline, said filter plate including a plurality of openings therein.

7. A polymerizing apparatus as claimed in claim 1, wherein said strainer includes a filter having side surfaces extending in a direction of flow through said circulating pipeline, said filter further including an end portion downstream of said side surfaces.

8. The polymerizing apparatus of claim 6, wherein said filter plate is inclined with respect to a flow passage direction through said circulating pipeline.

* * * * *